S. L. ALLEN.
Planting Machine.
No. 84,247. Patented Nov. 24, 1868.
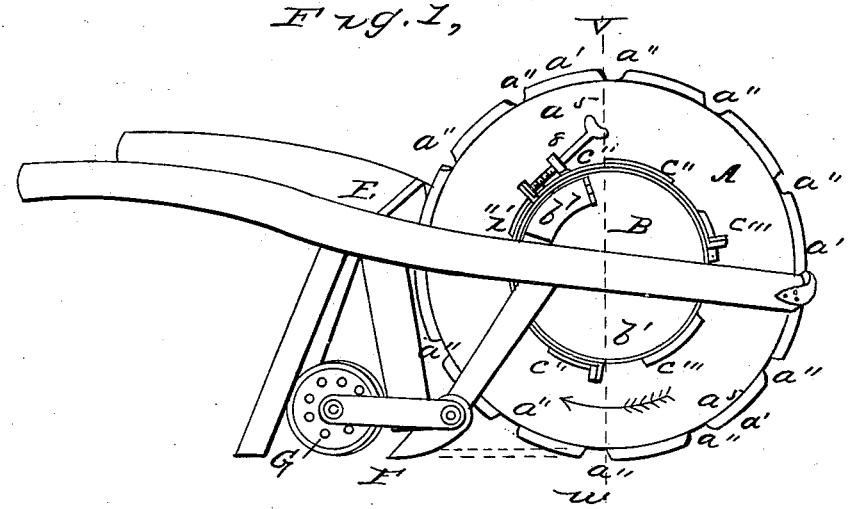
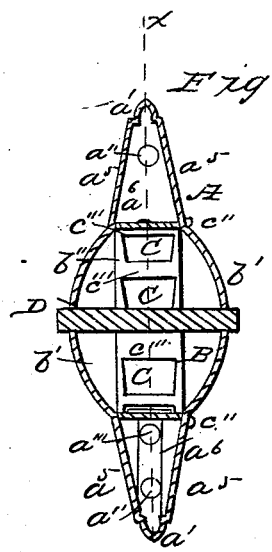
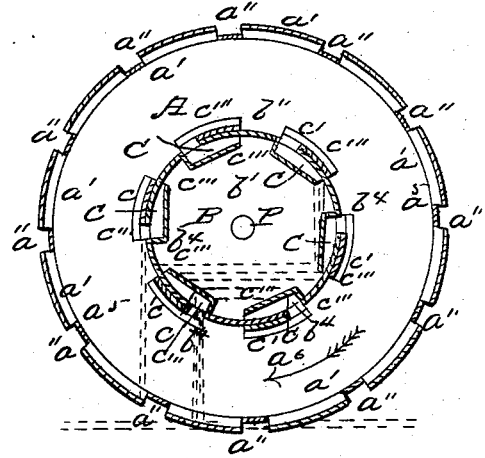
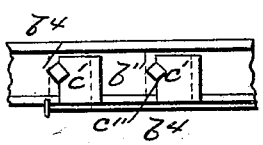
WITNESSES:
Benj. Morison
Wm. H. Morison
INVENTOR:
Samuel L. Allen

United States Patent Office.

SAMUEL L. ALLEN, OF CINNAMINSON, NEW JERSEY.

Letters Patent No. 84,247, dated November 24, 1868.

---

IMPROVEMENT IN PLANTING-MACHINE.

---

The Schedule referred to in these Letters Patent and making part of the same.

---

*To all whom it may concern:*

Be it known that I, SAMUEL L. ALLEN, of Cinnaminson, in the county of Burlington, and State of New Jersey, have invented a new and useful Improvement in Planting-Barrows; and I do hereby declare that the following is a full, clear, and exact description of the construction and operation of the same, reference being had to the accompanying drawings, making a part of this specification, in which—

Figure 1 is a side elevation of one of my said improved barrows;

Figure 2, a vertical section of the carrying-wheel thereof, cut on the dotted line $v\,w$ of fig. 1;

Figure 3, a like section of the carrying-wheel, cut on the dotted line $x\,y$ of fig. 2; and Figure 4, a sectional plan view of the adjustable slides and ring for regulating the area of the discharge-holes in the hopper-buckets.

Like letters of reference indicate the same parts when in the different figures.

The object of my improvement is to produce a planting-barrow that will not only be inexpensive of construction, and not liable to derangement in use, but will be less liable to become choked by the contained seed or fertilizer while in operation, and also more accurate and reliable in making the furrows, and depositing the contents of the hopper therein.

My invention consists substantially, as hereinafter described, of a hopper, which is provided with chambers, having adjustable discharging-holes, and is fixed within the centre of a hollow carrying-wheel, provided with dropping-holes, at regular distances apart, in a periphery or tread, which indents the ground, and thus forms furrows for receiving the deposits.

Referring to the drawings—

A is the hollow carrying-wheel;

B, the hopper;

C, the chambers;

D, the axle of the carrying-wheel;

E, the frame of the barrow;

F, the furrow-closing plates; and

G, the levelling or condensing-roller.

The carrying-wheel A, hopper B, and chambers C are all constructed of sheet-metal, and permanently united, so as to rotate together upon the axle D in the frame E, when the latter is pushed along over the ground.

The hopper B consists of two concave disks $b'\,b'$, united by their edges, respectively, to the ends of a short hollow cylinder, $b''$, the sides of which have a series of rhombic-shaped holes, $b^4$, at equal distances apart.

Around the outer surface of the cylinder $b''$ there is arranged a series of sliding plates, $c'$, one for each of the rhombic holes $b^4$, having a V-notch at one end, and being attached to an adjusting-ring, $c''$, whereby the said plates $c'$ can be readily slid backward and forward together a short distance around the cylinder, so that the openings $b^4$ in the same can be diminished or increased in area simultaneously by moving the ring $c''$, the distance of the movement being controlled by a set-screw, 8, which is adjustable for the purpose. (See figs. 1 and 4.)

Around the inner side of the hollow cylinder $b''$, the chambers C are fixed, and so that their holes $b^4$ will serve respectively as outlets, near the bottom ends of the chambers, for the discharge of the contents of the latter, as the carrying-wheel is rotated or rolled forward on its axle D in the direction of the arrow. (See fig. 3.)

The mouths $c'''$ of the chambers C are made narrower than their bottoms, (see fig. 3,) for the purpose of preventing any packing therein of the contents of the hopper B, an objectionable result, which would occur if their mouths were as large as their bottoms.

The periphery or tread of the wheel A consists of a rim, $a'$, of sheet-metal, and, transversely, in the form of two curves joined at their outer edges, and adapted, in its width and height, to produce, by indentation, a sunken furrow, of a corresponding section, and sufficient depth and width to receive the droppings of the machine as the wheel A rolls over the loose ground, and is connected to the ends of the cylindrical portion of the hopper B by means of two annular plates, $a^5\,a^5$, so as to produce a continuous channel, $a^6$, around between the cylinder $b''$ and the curved rim $a'$, which forms the periphery or tread of the wheel, suitable slots, $c'''$, being made between one of the said plates and the sides of the cylinder $b''$, to allow of a free motion and adjustment of the slides $c'$ by means of the ring $c''$.

At equal distances apart, a series of holes, $a''\,a''$, is made through the rim or tread $a'$ of the wheel A, for allowing the grain or fertilizer which is discharged from the hopper B into the channel $a^6$, to drop or trail into the furrow made by the tread of the wheel A, as the latter is rotated upon its axle D by one's pushing the barrow forward.

The covering-plates F and the roller G, being hinged to the frame E, rest on the ground, and swing freely in rear of the wheel A, and therefore may be either used or turned up out of contact with the ground. (See fig. 1.)

In the operation of this planter, the seed or fertilizer having been introduced, through the door $b'$, into the hopper B, and the area of the discharge-holes in the chambers C adjusted by means of the slides $c'$, connecting-ring $c''$, and set-screw 8, the barrow is then pushed along in the intended direction of the rows or furrows, thus causing the wheel A to roll over the loose ground, indent the furrow, and trail the deposits thereinto, in a regular and continuous stream, the covering-plates F and the roller G following, and closing the said furrow, without scattering the deposits, and condensing or levelling the surface of the covering-ground.

During the rotary motion of the wheel A, the narrow mouths of the empty chambers C pass downward into the loose contents of the hopper, (which may be either wholly or only partially filled,) and take in a sufficient supply of the said contents to allow a proper quantity to be freely discharged, through the holes $b^1$ in the lower ends of the chambers C, into the continuous channel $a^6$ below, and, from this latter, subsequently dropped or trailed, from two or more of the holes $a''$, in a regular or continuous stream, into the previously-indented furrow. (See fig. 3.)

It will be seen that this planting-barrow is inexpensive of construction, and not liable to derangement in use; that, from the peculiar construction and arrangement of the hopper and chambers, as described, choking cannot take place therein; and that the furrows, being produced by indentation, as described, will have smooth or even sides, and that therefore the deposits will tend more certainly to its middle, and not be liable to be scattered or displaced in covering the furrows.

Having thus fully described my improvement, What I claim as new, and desire to secure by Letters Patent, is confined to the following, viz:

1. In combination with the carrying-wheel A, I claim a central hopper, B, having chambers C constructed and arranged around in the said hopper, substantially as and for the purpose described.

2. In combination with the said hopper and chambers, arranged and combined as described, I claim the slides $c'$, constructed and operating substantially as and for the purpose described.

3. In combination with the hopper B and the perforated rim or tread $a'$ of the wheel A, I claim the continuous intervening channel $a^6$, as and for the purpose described.

SAMUEL L. ALLEN.

Witnesses:
BENJ. MORISON,
WM. H. MORISON.